Figure 1:
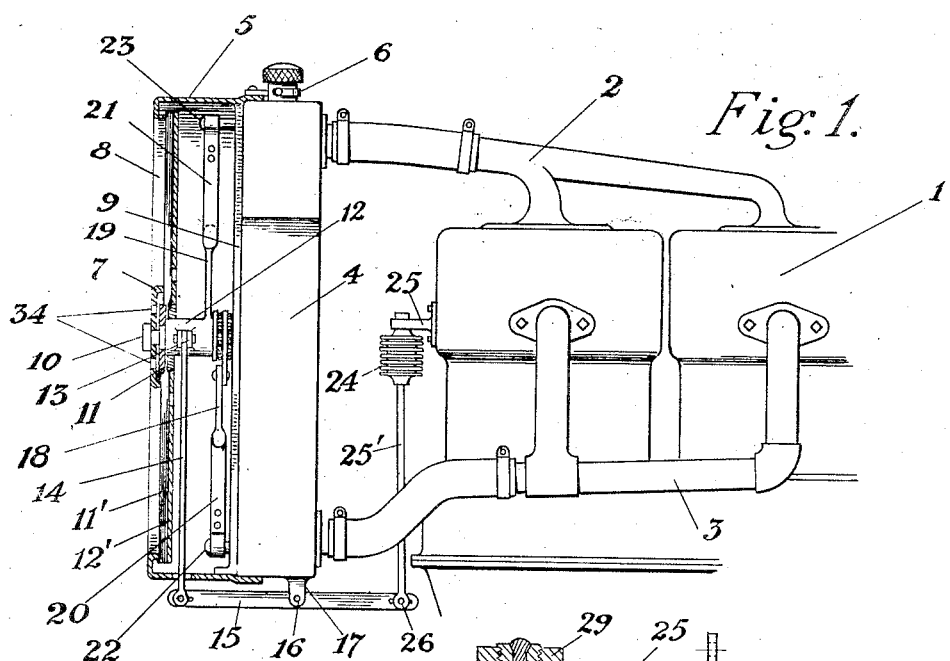

W. M. FULTON.
AUTOMATIC THERMOSTATIC SAFETY DEVICE IN CONNECTION WITH RADIATOR DAMPERS.
APPLICATION FILED AUG. 7, 1916.

1,364,927.

Patented Jan. 11, 1921.

Inventor
Weston M. Fulton

By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

AUTOMATIC THERMOSTATIC SAFETY DEVICE IN CONNECTION WITH RADIATOR-DAMPERS.

1,364,927.          Specification of Letters Patent.     Patented Jan. 11, 1921.

Application filed August 7, 1916. Serial No. 113,620.

*To all whom it may concern:*

Be it known that I, WESTON M. FULTON, a citizen of United States of America, and a resident of Knoxville, Tennessee, have invented a new and useful Improvement in Automatic Thermostatic Safety Devices in Connection with Radiator-Dampers, which invention is fully set forth in the following specification.

This invention relates to a cooling system for internal combustion engines, and is particularly designed as a cooling system for such engines when used in automobiles.

An object of this invention is to provide an improved cooling system comprising a radiator, through which and the jacket or jackets of the engine a cooling medium is circulated, with means for automatically regulating the temperature of the cooling medium through regulation of the flow of air through the radiator by thermosensitive means so positioned as to be readily accessible for inspection and repair. A further object of the invention is to provide a system of the type referred to wherein may be employed a volatile fluid thermostat charged to operate at lower temperatures than has heretofore been the case.

A still further object of the invention is to provide a cooling system of the type referred to which is so constructed as to guard against dangerous conditions arising in the system in case the thermosensitive device gets out of order. Yet another object of the invention is to provide, in a system for cooling internal combustion engines comprising a radiator, automatic means for controlling the passage of air through the radiator at all times controlled by the temperature of such air. An additional object of the invention is to provide a system of the type referred to wherein, in case of failure of the temperature control or the thermosensitive means becoming non-responsive to temperature changes, the means regulating the flow of air through the radiator will automatically assume a position of safety admitting the maximum flow of air through said radiator.

Stated briefly, the invention comprises, in combination with the cooling system of an internal combustion engine including a radiator, means for regulating the passage of air through the radiator, and thermosensitive means subjected at all times to the temperature of air flowing through the radiator for automatically controlling said regulating means, said thermosensitive means preferably being so constructed as to open wide said regulating means upon failure of the thermosensitive means to be responsive to temperature changes.

The invention is capable of receiving a variety of mechanical forms, one of which has been shown on the accompanying drawing. But it is to be expressly understood that the drawing is for purposes of illustration only, and is not to be construed as a definition of the limits of the invention, reference being had to the appended claims for that purpose.

Figure 2:
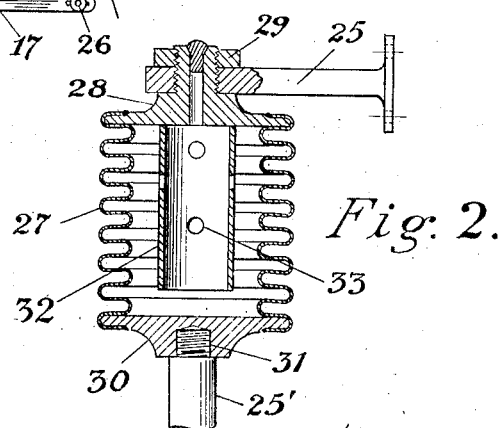

Referring to the drawing, wherein the same reference characters designate corresponding parts in the several figures, Figure 1 is an elevation, partly in section, of a cooling system for an internal combustion engine embodying the present invention;

Fig. 2 is a detail view showing a cross section on an enlarged scale through the thermosensitive means.

Referring in detail to the drawing, 1 represents diagrammatically any preferred form of internal combustion engine such, for example, as is commonly employed in automobiles, the same being provided with the usual jacket or jackets through which it is designed a cooling medium shall circulate to maintain the engine cylinders at a proper temperature. 2 represents generally the outlet manifold leading from the cylinder jackets, and 3 the inlet manifold leading thereto. 4 is any preferred or conventional form of radiator through which the cooling medium of the system is circulated.

Means are provided for regulating the flow of air through the radiator, such means preferably taking the form of a damper device, in which term is included shutters, mounted upon and positioned in front of such radiator. While any one of a variety of forms of damper devices may be employed for regulating the flow of air through the radiator, the illustrated construction embodies a damper of the type shown and claimed in my application filed July 5, 1916, Serial No. 107,661. In the form illustrated on the drawing, this damper comprises a housing 5, preferably shaped to fit the front of the radiator and coextensive with the same, provided with any suitable means, as a clamping ring 6, for supporting such housing in operative relation to the radiator. The front wall 7 of the housing is provided with a plurality of apertures 8 preferably arranged radially with respect to the approximate center of the front wall. Within the housing and extending parallel to the front wall 7 is a transverse bar 9, and supported in the front wall 7 and the transverse bar 9 is a pin 10. Rotatably mounted on the pin 10 are a plurality of sleeves 11 and 12 carrying radial vanes 11' and 12' respectively adapted to cover and uncover said apertures 8. The two sets of vanes 11' and 12' are provided with interengaging projections, whereby movement of one set beyond a predetermined limit causes movement of the next adjacent set through interengagement of the aforesaid projections. The outer of the sleeves 12 is provided with a crank-arm 13 to which is pivotally connected a link 14 in turn pivotally connected to a walking-beam 15 pivoted at 16 in a bracket 17 extending from the radiator or an adjacent member. To provide against rattling or fluttering of the vanes, and to normally urge them in a direction to entirely uncover the apertures in the front wall 7, the sleeves 11 and 12, in the form shown, are respectively provided with arms 18 and 19 upon which bear leaf springs 20 and 21 respectively. Said springs may be mounted in any suitable manner, the embodiment illustrated comprising a pair of pins 22 and 23 projecting inwardly from the cross bar 9 and carrying the aforesaid springs 20 and 21 respectively.

Means are provided for automatically controlling the aforesaid damper to automatically regulate the flow of air through the radiator in accordance with the needs of the system as determined by the temperature of the air as it flows through the radiator. In the form shown, this means comprises a thermosensitive device, generally indicated at 24, mounted in any convenient manner, as by a bracket 25 extending from the walls of the engine housing. The movable member of the thermosensitive device is connected to link 25' which, in turn, is pivotally connected to the walking-beam 15, as shown at 26.

While any one of a variety of thermosensitive devices may be employed, the preferred construction, embraces thermosensitive means of the type disclosed in my application Sr. No. 17,917, filed March 29, 1915, of which this application, so far as respects the thermosensitive device, is a continuation. As shown, this thermosensitive device comprises a corrugated expansible and collapsible tubular vessel 27, preferably of an elastic metal such as brass, having a closure 28 constituting a rigid end wall which is fixedly mounted on the bracket 25 in any suitable manner; as by providing the said end wall 28 with a screw-threaded boss received by the said bracket 25 and held thereon by any convenient means, as a nut 29. The opposite end of the said vessel is provided with a closure 30 constituting a movable end wall for the vessel, said movable end wall 30 being operatively connected with link 25', as by the screw-threaded connection shown at 31. Within the expansible and collapsible vessel a tubular stop 32 is mounted on the fixed end wall 28 to provide a stop against which the movable end wall 30 will collapse at temperatures below those at which the thermosensitive device is intended to respond and assume the control of the means for regulating the passage of air through the radiator. The said tubular stop 32 is shown as provided with a plurality of apertures 33 to enable the ready circulation of the thermosensitive fluid with which the vessel is charged. The expansible and collapsible vessel 27 is charged with a volatile thermosensitive fluid at a pressure below atmospheric, a hole being conveniently drilled in the end wall 28 for injecting the charge, and the hole then being sealed as with solder. As the internal pressure is thus less than the external pressure, said vessel will be maintained relatively collapsed against the elasticity inherent in the vessel and with its movable end wall 30 bearing against the end of the tubular stop 32 at temperatures below that at which the thermosensitive device is designed to become responsive to temperature changes.

Assume now that the expansible and collapsible vessel 27 has been charged with a volatile thermosensitive fluid at a pressure below atmospheric, or what is the equivalent, charged, while in collapsed condition, with a thermosensitive fluid at approximately atmospheric pressure and that the elasticity inherent in the walls of the vessel is of itself, or when supplemented by the tension of springs 20 and 21, sufficient to actuate the damper through the operative connections provided. Under conditions wherein the vessel is subjected to temperatures below that at which said vessel is intended to assume control of the means for regulating the passage of air through the radiator, the movable end wall 30 is collapsed against the end of the tubular stop 32, against the inherent elasticity of the vessel and the pressure of the thermosensitive fluid contained therein, and the tension of springs 20 and 21 when used.

When the engine starts, the cooling medium is circulated through the jackets and radiator 4. As the thermosensitive device is in collapsed condition, it maintains the vanes of the damper device in a position to completely close the apertures provided in the front wall of the damper housing. In order that some air may at all times flow through the radiator and impinge upon the thermosensitive device to control the latter, the front wall of the housing and also preferably some or all of the vanes are provided with small apertures, as illustrated at 34. As practically the only air passing through the radiator is that admitted by the small apertures 34, substantially no cooling influence is exercised on the cooling medium, and the temperature of the same rises rapidly to that which is considered the most efficient for the operation of the engine. When the temperature of the cooling medium approaches such degree, the air passing through apertures 34 and flowing through the radiator to impinge upon the thermosensitive device becomes sufficiently heated to result in an expansion of the expansible and collapsible vessel. The said vessel expands in accordance with the rise in temperature and, through link 25′, walking-beam 15, link 14 and crank-arm 13, rotates the outer sleeve 12 to move the vanes 12′ in a direction to partially uncover the apertures in the front wall of the housing 5. Continued rise in temperature of the air flowing through the radiator causes further expansion of the aforesaid vessel, opening the damper device still wider. When vanes 12′ have moved to a position wherein the projections thereon engage the corresponding projections on the vanes 11′, further movement of the vanes 12′ causes a movement of the vanes 11′ to still further uncover the apertures 8.

If at any time a leak occurs in the expansible and collapsible vessel, whereby the pressure within and without the same becomes equalized, the elasticity inherent in such vessel, supplemented by the tension of the springs when used, causes the same to expand and open wide the damper, thereby moving such damper to a position of safety, admitting the maximum flow of air through the radiator. It will be apparent that the temperature of the air flowing through the radiator will be in substantial proportion to the temperature of the cooling medium circulating through the radiator. Accordingly, the thermosensitive means is subjected to a temperature control which is, for practical purposes, in substantial proportion to the temperature of the cooling medium circulating through the cooling system. As, however, the air will always be at a materially lower temperature than the cooling medium of the system, it will be apparent that the thermosensitive vessel may be charged to operate at a considerably lower temperature than were the vessel subjected to the cooling medium itself as it is circulated through the cooling system. It will also be apparent that by positioning the thermosensitive means where it is exposed to the air passing through the radiator, in the space between the radiator and the engine casing, it is at all times readily accessible for purposes of inspection and repair.

While it is preferred to construct the walls of the expansible and collapsible vessel of a resilient metal, this is not essential, since the walls might be of non-resilient material arranged to collapse against the tension of a spring. It is only essential that the collapse shall take place against some elastic force, whether such force be found in the metal walls of the vessel or in a spring within or without the same.

While a damper device of the type disclosed in my application Serial No. 107,661 has been disclosed for regulating the flow of air through the radiator, it is to be expressly understood that, while this is the preferred construction, any suitable means for regulating the flow of air through the radiator falls within the limits of my invention. Also while thermosensitive means constructed as shown in my application Serial No. 17,917 has been illustrated for operating said regulating means, it is to be understood that the invention is not limited thereto, as any other suitable thermosensitive means within the limits of the appended claims may be employed instead. Furthermore, while the springs 20 and 21 have been illustrated as tending to move the damper vanes to wide open position, and thereby as aiding the elasticity inherent in the expansible and collapsible vessel, it will be understood that the springs may oppose such elasticity provided the latter be sufficient to overcome the springs and move the damper to its position of safety upon equalization of the pressure within and without the vessel.

What is claimed is:

1. In a cooling system for internal combustion engines, in combination with the radiator, a damper device coextensive with the face of the radiator for regulating the passage of air through said radiator, thermosensitive means subjected to the temperature of the air flowing through said radiator and operatively connected to said damper device, and means whereby said thermosensitive means is subjected to the temperature of air flowing through said radiator when said damper device is closed.

2. In a cooling system for internal combustion engines, in combination with the radiator, a device for regulating the passage of air through said radiator, thermosensitive means subjected to the temperature of the air flowing through said radiator and operatively connected to said regulating-device, and means whereby air is permitted to flow through the radiator into heat-interchanging relation with said thermosensitive means when said regulating-device is closed.

3. In a cooling system for internal combustion engines, in combination with the radiator, means for regulating the passage of air therethrough, and thermosensitive means subjected to the temperature of the air flowing through said radiator and operatively connected to said regulating means, the aforesaid means being so constructed as to open wide said regulating means upon said thermosensitive means becoming non-responsive to temperature changes.

4. In a cooling system for internal combustion engines, in combination with the radiator, means for regulating the passage of air therethrough, and thermosensitive means subjected to the temperature of the air flowing through said radiator and operatively connected to said regulating means, said thermosensitive means comprising an expansible and collapsible resilient vessel charged with a thermosensitive fluid at a pressure less than atmospheric.

In testimony whereof I have signed this specification.

WESTON M. FULTON